United States Patent Office 3,257,325
Patented June 21, 1966

3,257,325
STABLE, ALKALI-RICH, SODIUM SILICATES
Alfred Köster, Dusseldorf-Oberkassel, and Hans Rogner, Dusseldorf-Buderich, Germany, assignors to Philadelphia Quartz Company, Philadelphia, Pa., a corporation of Pennsylvania
No Drawing. Filed Mar. 8, 1962, Ser. No. 178,241
3 Claims. (Cl. 252—135)

INTRODUCTION

This invention generally relates to alkali-rich, storage stable sodium silicate and a method for making same.

THE PRESENT STATE OF THE ART

In the so-called industrial-cleaner field, there is a great demand for alkali silicates which have a high proportion of alkali, but which have no free caustic soda present. The term "alkali-rich sodium silicates" includes products which contain more than one mol of $Na_2O$ per mol of $SiO_2$ (i.e., a $Na_2O:SiO_2$ mol ratio greater than 1:1). Furthermore, these products must have rapid water solubility and be in the form of a free-flowing, dust-free dry powder which will not cake in storage. Presently available commercial products only have this combination of desirable characteristics to a partial extent.

It has already been suggested that the alkali-rich water-soluble orthosilicates and sesquisilicates, either anhydrous or pentahydrate, be employed. These are however to a great extent hygroscopic and susceptible to caking in prolonged storage. A further disadvantage of such suggested compounds is that in commercial pulverization, such as grinding, many difficulties arise, or complicated crystallization procedures are necessary.

OBJECTS

It is therefore an object of this invention to provide alkali-rich sodium silicates corresponding to sodium sesquisilicate mono- and di-hydrate and mixtures thereof with sodium metasilicate which have rapid water solubility and which will not cake in storage. Other objects and advantages will be apparent after reading the following detailed description.

THE PRESENT INVENTION

It has now been discovered that an alkali-rich, storage-stable sodium silicate having the above-described desirable combination of properties may be obtained by:

(a) Providing a commercial waterglass solution having a solids content of 30 to 56% by weight;
(b) Admixing with said commercial waterglass solution an aqueous caustic soda solution;
(c) The amount of said aqueous caustic soda solution being sufficient so that the admixture of commercial waterglass solution and caustic soda solution will have an over-all $Na_2O:SiO_2$ weight ratio of between about 1:0.65 and 1:0.85;
(d) Initially heating said admixture for about 5–30 minutes to a temperature within the range of between about 100 and 120° C.; and
(e) Further heating said admixture within the temperature range of 120° and 180° C. under conditions of violent agitation to thereby reduce the water content of the heated product to within the range of about 10 and 20 weight percent.

The term "commercial waterglass solution" as used above is understood to mean a sodium silicate solution whose mol ratio of $Na_2O:SiO_2$ is between about 1:2 and 1:3.5 and preferably between about 1:2 and 1:2.2. Experience has shown that waterglass solutions having a solids content between about 30 and 56% are satisfactory and a solids content of 50–55% is preferable.

The most effective concentration range for the aqueous caustic soda solution lies mostly above 30% and most desirably in the neighborhood of 50% by weight of caustic soda.

The waterglass and caustic soda may be mixed together in any desired manner. One satisfactory procedure is to start with a waterglass solution preheated to about 30 to 40° C. and then add the caustic soda solution until a $Na_2O:SiO_2$ weight ratio between 1:0.65 and 1:0.85 is reached in the mixture. The mixture is then heated for between approximately 5 to 30 minutes within the temperature range of 100 to 120° C. Only then does there occur an actual reduction in the water content by the employment of a suitable evaporation apparatus, such as for example a continuous horizontal pug mill with means for temperature control, with temperatures raised to between 120 and 180° C. and preferably between 150 and 180° C. It is desirable to maintain a steady, vigorous agitation during heating.

By employing a continuous horizontal pug mill with means for temperature control during said heating steps the product emerges in powder form and is ready for immediate use. The product can be ground or pulverized if desired. In some instances cooling is desirable.

The above-described method for the production of alkali-rich sodium silicates is preferably continuous. This is achieved by continuously pouring corresponding portions of pre-heated commercial waterglass solution and caustic soda solution into a mixing container. The mixture is drawn off by an overflow device and led off in heated pipes, and further heated to 100 to 120° C. The heated mixture is then fed into a continuous horizontal pug mill with means for temperature control and emerges in the form of a powdered product. The products have excellent solubility and storage properties.

The products produced in accordance with this invention generally correspond to sodium sesquisilicate dihydrate or monohydrate, or mixtures thereof with sodium metasilicate. Mixtures of sodium sesquisilicate mono- and di-hydrate with sodium metasilicate have a $Na_2O:SiO_2$ weight ratio of between 1:0.65 and 1:0.85.

EXAMPLES

The following examples are illustrative of a preferred embodiment of the present invention. It should be understood that these examples are not intended to limit the invention and that obvious changes may be made by those skilled in the art without changing the essential characteristics and the basic concept of the invention. The parts and percentages are by weight, the temperature is room temperature and the pressure is atmospheric, unless otherwise indicated.

Example 1

30 kg. of waterglass solution with a solids content of 55.5% and a $Na_2O:SiO_2$ weight ratio of 1:2.2 were preheated in a mixing apparatus to within the range of 30 to 40° C. and then mixed with 24 kg. of a 50% aqueous caustic soda solution so that the material in the mixing apparatus had a $Na_2O:SiO_2$ weight ratio of 1:0.65.

This mixture was heated, with vigorous stirring, for about 15 minutes to a temperature of 100° C. and then fed into a continuous horizontal pug mill with temperature control. The product in the pug mill was heated to 170° C. during steady, vigorous agitation. At the discharge end of the pug mill the product emerged as a free-flowing dry powder having a water content of about 20% and being close to the composition of sodium sesquisilicate dihydrate and which would not cake even under prolonged storage.

*Example 2*

A product according to this invention was obtained starting with a solution of sodium silicate having about 9.16% $Na_2O$ by weight and a weight ratio of $Na_2O:SiO_2$ of 1:0.31. To this was added sufficient liquid caustic soda having an alkali content of about 35% by weight to changed the weight ratio of this solution to about 1:0.85 $Na_2O:SiO_2$.

This mixture was raised to about 120° C. over a period of about 30 minutes with strong mixing and evaporation of considerable moisture. The thickened solution was fed into a continuous rotating paddle conveyor having a dual interacting system of paddles on rotating shafts. The paddles were set to advance the thickened solution and to have a self-cleaning action whereby the vigor of the agitation was increased. This conveyor was heated to bring the mass of alkali-rich silicate to a temperature of about 180° C. with consequent loss of the necessary moisture, and processed until the water content was about 10% corresponding approximately to anhydrous sodium metasilicate and the di-hydrate of sodium sesquisilicate, and the product was a dry, free-flowing powder which did not cake during long storage.

*Example 3*

A product produced in accordance with the procedure of Example 1 (but using slightly less caustic soda) had the following analysis: $Na_2O$, 49.5%; $SiO_2$, 36.8%; $H_2O$, 13.1%; $Na_2O:SiO_2$ weight ratio, 1:0.74.

This corresponded to a mixture of sodium sesquisilicate dihydrate, sodium sesquisilicate monohydrate and sodium metasilicate anhydrous.

Those skilled in the chemical arts, and particularly in the art to which this invention pertains, will readily appreciate that many modifications of the basic invention set forth here are possible. All of these modifications are considered to be within the scope of the present claims by virtue of the well-established "doctrine of equivalents."

What is claimed is:

1. A method for making an alkali-rich storage-stable sodium silicate which comprises:
   (a) providing a sodium silicate aqueous solution having a $Na_2O:SiO_2$ mol ratio ranging between about 1:2 and 1:3.5;
   (b) admixing with said sodium silicate solution an aqueous caustic soda solution having between 30 and 50% by weight of caustic soda;
   (c) the amount of said aqueous caustic soda solution being sufficient so that the admixture of sodium silicate aqueous solution and caustic soda solution will have an over-all $Na_2O:SiO_2$ weight ratio of between about 1:0.65 and 1:0.85;
   (d) initially heating said admixture for about 15 minutes at a temperature of about 110° C.;
   (e) further heating said admixture at a temperature of about 170° C. to thereby reduce the water content of the heated product to within the range of about 10–20 weight percent; and
   (f) recovering the free-flowing dry powder product which has the property of not caking even upon prolonged storage.

2. A method of producing an alkali-rich, storage-stable sodium silicate which comprises:
   (a) providing a commercial waterglass solution having a solids content of 30 to 56% by weight;
   (b) admixing with said commercial waterglass solution an aqueous caustic soda solution;
   (c) the amount of said aqueous caustic soda solution being sufficient so that the admixture of commercial waterglass solution and caustic soda solution will have an over-all $Na_2O:SiO_2$ weight ratio of between about 1:0.65 and 1:0.85;
   (d) initially heating said admixture for about 5–30 minutes to a temperature within the range of between about 100 and 120° C.; and
   (e) further heating said admixture within the temperature range of 120° and 180° C. under conditions of violent agitation to thereby reduce the water content of the heated product to within the range of about 10 and 20 weight percent.

3. As a product resulting from the process of claim 1, a mixture consisting essentially of sodium sesquisilicate mono- and di-hydrate with sodium metasilicate having an $H_2O$ content of 10–20% and an $Na_2O:SiO_2$ ratio by weight of 1:0.65 and 1:0.85.

References Cited by the Examiner

UNITED STATES PATENTS

| | | | |
|---|---|---|---|
| 1,111,918 | 9/1914 | Paterson | 23—110 |
| 1,953,840 | 4/1934 | Waddell | 23—110 |
| 2,083,545 | 6/1937 | Burkhart et al. | 252—135 XR |
| 2,206,289 | 7/1940 | McDaniel | 23—110 |
| 2,230,909 | 2/1941 | Riggs et al. | 23—110 |
| 2,282,018 | 5/1942 | Baker | 252—135 |
| 2,284,248 | 5/1942 | Baker et al. | 252—135 |
| 2,525,079 | 10/1950 | Reeder et al. | 252—135 |
| 3,007,877 | 11/1961 | Allen | 252—135 |

JULIUS GREENWALD, *Primary Examiner.*

W. F. SCHULZ, *Assistant Examiner.*